(12) United States Patent
Yoshiura et al.

(10) Patent No.: US 10,974,393 B2
(45) Date of Patent: Apr. 13, 2021

(54) AUTOMATION APPARATUS

(71) Applicant: KABUSHIKI KAISHA YASKAWA DENKI, Kitakyushu (JP)

(72) Inventors: Yasufumi Yoshiura, Kitakyushu (JP); Hiroshi Anno, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 316 days.

(21) Appl. No.: 16/164,745

(22) Filed: Oct. 18, 2018

(65) Prior Publication Data

US 2019/0118383 A1 Apr. 25, 2019

(30) Foreign Application Priority Data

Oct. 20, 2017 (JP) .............................. JP2017-204049

(51) Int. Cl.
*B25J 9/16* (2006.01)
*G06T 7/70* (2017.01)
(Continued)

(52) U.S. Cl.
CPC ............ *B25J 9/1697* (2013.01); *B23Q 7/046* (2013.01); *B25J 9/1664* (2013.01); *G06T 7/70* (2017.01); *G06T 7/73* (2017.01); *G05B 2219/37067* (2013.01); *G05B 2219/37097* (2013.01); *G06T 2207/20081* (2013.01); *G06T 2207/20084* (2013.01)

(58) Field of Classification Search
CPC ...... B25J 9/0093; B25J 9/1692; B25J 9/1697; B65G 2203/044; B65G 43/00; B65G 47/905
See application file for complete search history.

(56) References Cited

U.S. PATENT DOCUMENTS 9,827,683 B1 * 11/2017 Hance ..................... B25J 19/023
9,958,862 B2 * 5/2018 Kapoor .................... B25J 9/161
(Continued)

FOREIGN PATENT DOCUMENTS

JP S60-217085 A 10/1985
JP H10-249765 A 9/1998
(Continued)

OTHER PUBLICATIONS

Korean Office Action for corresponding KR Application No. 10-2018-0117412, dated Feb. 8, 2020 (w/ machine translation).
(Continued)

*Primary Examiner* — Bhavesh V Amin
(74) *Attorney, Agent, or Firm* — Mori & Ward, LLP

(57) ABSTRACT

An automation apparatus includes a mechanism having a machine coordinate system and configured to work on a work which moves in the machine coordinate system, a sensor configured to successively detect positions of the work as the work moves, and a processor. The processor is configured to calculate a plurality of machine coordinate positions of the work in the machine coordinate system successively based on the positions successively detected by the sensor, and is configured to determine, based on the plurality of machine coordinate positions of the work, a working position at which the mechanism is configured to work on the work.

15 Claims, 12 Drawing Sheets

(51) Int. Cl.
  *B23Q 7/04* (2006.01)
  *G06T 7/73* (2017.01)

(56) References Cited

U.S. PATENT DOCUMENTS

| | | | |
|---|---|---|---|
| 10,807,240 B2 * | 10/2020 | Kurihara | B25J 9/1664 |
| 2001/0006334 A1 * | 7/2001 | Suzuki | B62D 57/032 |
| | | | 318/568.1 |
| 2007/0219668 A1 * | 9/2007 | Takahashi | B25J 9/1612 |
| | | | 700/249 |
| 2010/0305754 A1 * | 12/2010 | Ban | G05B 19/4182 |
| | | | 700/248 |
| 2011/0218675 A1 * | 9/2011 | Ban | B25J 9/1697 |
| | | | 700/259 |
| 2016/0151916 A1 * | 6/2016 | Kanno | B65G 47/90 |
| | | | 700/228 |
| 2016/0340006 A1 * | 11/2016 | Tang | B64C 39/024 |
| 2017/0028562 A1 * | 2/2017 | Yamazaki | B25J 9/1697 |
| 2017/0066133 A1 * | 3/2017 | Ooba | B25J 9/1697 |
| 2017/0139407 A1 * | 5/2017 | Sakaguchi | B25J 9/1671 |
| 2018/0043547 A1 * | 2/2018 | Hance | G06Q 10/063 |
| 2019/0118383 A1 * | 4/2019 | Yoshiura | B23Q 7/046 |
| 2019/0256300 A1 * | 8/2019 | Shimamura | B25J 9/1697 |
| 2019/0381657 A1 * | 12/2019 | Ooba | B25J 9/1692 |
| 2019/0389069 A1 * | 12/2019 | Kalbavi | G06F 3/0346 |

FOREIGN PATENT DOCUMENTS

| | | |
|---|---|---|
| JP | 2009-291895 A | 12/2009 |
| JP | 2010-280010 A | 12/2010 |
| JP | 2013-246217 A | 12/2013 |
| JP | 2016-107349 A | 6/2016 |
| JP | 2017-47511 | 3/2017 |
| JP | 2017-064910 A | 4/2017 |
| JP | 2017-094406 A | 6/2017 |

OTHER PUBLICATIONS

Japanese Office Action for corresponding JP Application No. 2017-204049, dated Jun. 5, 2019 (w/ machine translation).

* cited by examiner

AUTOMATION APPARATUS

CROSS-REFERENCE TO RELATED APPLICATION

This application claims priority from Japanese Patent Application No. 2017-204049 filed with the Japan Patent Office on Oct. 20, 2017, the entire content of which is hereby incorporated by reference.

BACKGROUND

1. Technical Field

An embodiment of the disclosure relates to an automation apparatus and a method for controlling a mechanism.

2. Related Art

JP-A-2017-47511 discloses a method for setting a conveyor coordinate system in relation to a robot system. In the robot system, a robot conducts work on an object conveyed by a conveyor. The conveyor coordinate system is used to define a position of the object on the conveyor. The conveyor coordinate system has a predetermined relationship with a base coordinate system of the robot.

SUMMARY

According to one aspect of the disclosure, an automation apparatus includes a mechanism having a machine coordinate system and configured to work on a work which moves in the machine coordinate system, a sensor configured to successively detect positions of the work as the work moves, and a processor. The processor is configured to calculate a plurality of machine coordinate positions of the work in the machine coordinate system successively based on the positions successively detected by the sensor, and is configured to determine, based on the plurality of machine coordinate positions of the work, a working position at which the mechanism is configured to work on the work.

According to another aspect of the disclosure, a method for controlling a mechanism includes providing the mechanism which has a machine coordinate system and which is configured to work on a work which moves in the machine coordinate system, detecting positions of the work successively as the work moves, calculating a plurality of machine coordinate positions of the work in the machine coordinate system successively based on the positions successively detected, and determining, based on the plurality of machine coordinate positions of the work, a working position at which the mechanism is configured to work on the work.

DESCRIPTION OF THE EMBODIMENTS

Figure 1:
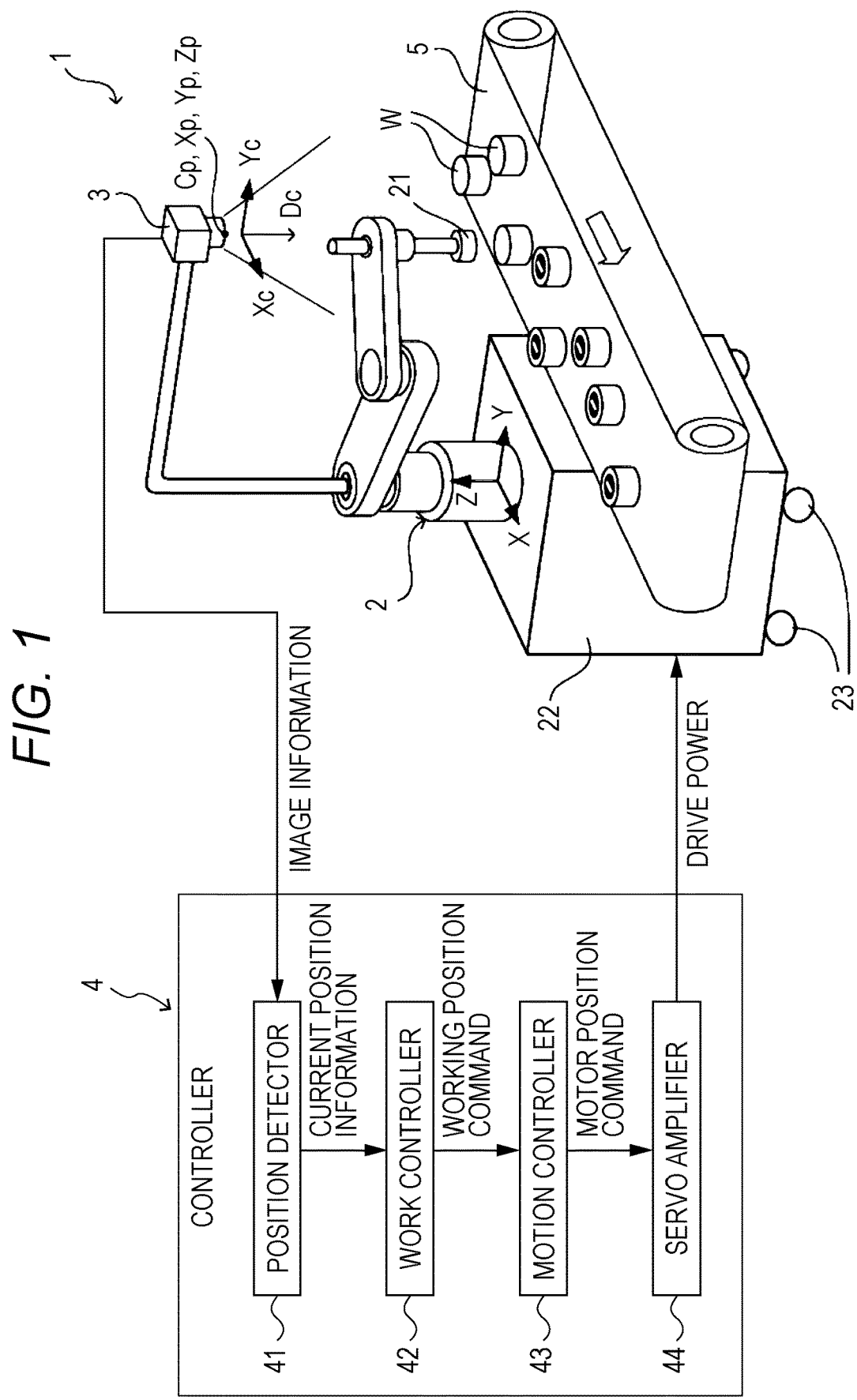
FIG. 1 represents an example of a schematic system block configuration of an automation apparatus of an embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An embodiment is described hereinafter with reference to the drawings.

<Schematic Configuration of Automation Apparatus>

FIG. 1 represents an example of a schematic system block configuration of an automation apparatus of the embodiment. The automation apparatus illustrated in an example of the embodiment is a system that individually impresses, with a stamp, top surfaces of a plurality of works transferred and moved by a belt conveyor. As illustrated in FIG. 1, an automation apparatus 1 includes a working mechanism 2, a camera 3, and a controller (processor) 4.

The working mechanism 2 is a manipulator arm (a SCARA mechanism, a horizontal multi-axis mechanism) including three vertical rotating shafts and one vertical elevating-lowering shaft in the illustrated example of the embodiment. An end effector 21 is mounted on an aim tip portion. The end effector 21 includes a stamp that can impress a predetermined printing content, such as the date of manufacture, on a surface of a work W. In the illustrated example, the work W is a cylindrical can, and is placed on the belt conveyor in such a manner as to orient its axial direction in the vertical direction. The stamp of the end effector 21 is a circular stamp having a little smaller outer diameter than a circular top plane of the work W.

The work causing the working mechanism 2 to execute is to press a stamp 21 on a surface of the circular top plane of the work W in a substantially coaxial location. Hence, the work contents that are executed by the working mechanism 2 include moving the arm in such a manner as to horizontally adjust a center position (a reference position of the aim tip portion) of the circular stamp 21 to a working position that is a center position on the circular top plane of the work W being a work target, and subsequently lowering and pressing the stamp 21. The work is conducted within a workable space area (not particularly illustrated) defined by a mechanical structure of the working mechanism 2. Control of the work is performed on the basis of a process of computing a coordinate position in a machine coordinate system XYZ being three-axis Cartesian coordinates set with reference to a mechanical location of the working mechanism 2 in the workable space area (hereinafter referred to as "its own machine coordinate system XYZ").

Moreover, in the example of the embodiment, a base 22 of the working mechanism 2 is provided with a caster 23. The entire working mechanism 2 can move to an arbitral position by, for example, a user's manual work. A belt conveyor 5 that transfers and moves the work W is configured as a separate body from the working mechanism 2, and is installed in advance in such a manner as to be fixed to a floor surface of a worksite. The belt conveyor 5 has a transportable configuration, and may be installed in advance in such a manner as to be fixed to the floor surface of the worksite. Mechanical and control specifications including the movement direction, the movement speed, and the movement height of a belt of the belt conveyor 5 are assumed to be unknown.

In this example, the camera 3 is a sensor that can optically capture image information (detection information) of a two-dimensional pixel array. The camera 3 is fixed to the working mechanism 2 in a position and an attitude that allow the camera 3 to vertically overlook the workable space area of the working mechanism 2 from above. The camera 3 can capture an image of the entire workable space area of the working mechanism 2 or at least a part thereof.

The controller 4 performs various processes related to the work of the working mechanism 2 on the basis of the image information captured by the camera 3, and supplies drive power to the working mechanism 2. The controller 4 includes a position detector 41, a work controller 42, a motion controller 43, and a servo amplifier 44.

In the example of the embodiment, the position detector 41 performs image recognition of the image information captured by the camera 3 to detect, at this point in time, current position information being position information of the work W that exists in the workable space area of the working mechanism 2. In the example of the embodiment, the current position information of the work W is set in a position of a work reference point where the target work of the working mechanism 2 (the stamping work in this example) can be conducted on the work W (that is, a position that can be the working position). In other words, in the example of the embodiment, the position of the center point on the surface of the circular top plane of the work W having the cylindrical shape is detected as the current position information of the work W. The position detector 41 outputs the current position information as a coordinate position in its own machine coordinate system XYZ (numerical information on the axes of the XYZ coordinate system).

The setting of the current position information of the work W can change depending on the work content to be executed by the working mechanism 2. For example, when the working mechanism 2 conducts holding work, the position of the center of gravity or the like of the work W is appropriate as the current position information of the work W. Moreover, for example, when the working mechanism 2 conducts spray painting work, a position a predetermined distance away from a painting place on the surface of the work W is appropriate as the current position information of the work W (not particularly illustrated). Hence, depending on the work content of the working mechanism 2, the current position information of the work W may be set, not limited to on the surface or occupied space of the work W in the actual physical world, but also outside the surface or occupied space of the work W. Alternatively, the current position information being the existence criterion of the work W may be set on the surface or occupied space of the work W. Furthermore, the work reference point in a predetermined positional relationship with the current position information may be set separately.

Moreover, when a plurality of the works W is captured in the image information, the position detector 41 detects pieces of current position information of the works W individually. The internal processing configuration of the position detector 41 is described in detail in FIG. 2 below.

The work controller 42 outputs a working position command as a position to which the end effector 21 (the stamp) of the working mechanism 2 is moved to conduct work (the working position), on the basis of the current position information of the work W detected by the position detector 41. The working position command is also outputted as the coordinate position in its own machine coordinate system XYZ (numerical information on the axes of the XYZ coordinate system). The internal processing configuration of the work controller 42 is also described in detail in FIG. 2 below.

The motion controller 43 computes, for example, a target rotation angle of each drive shaft motor (illustration omitted) of the working mechanism 2 for moving the end effector 21 of the working mechanism 2 to a position of the working position command input from the work controller 42, on the basis of the working position command. The motion controller 43 outputs a motor position command corresponding to the computation result. Such a computation of the target rotation angle is simply required to be made by a known computational technique for, what is called inverse kinematics, and its detailed description is omitted here.

The servo amplifier 44 controls the feed of drive power that controls the drive of each drive shaft motor (illustration omitted) of the working mechanism 2, on the basis of the motor position command input from the motion controller 43.

The entire controller 4 may be configured in such a manner as to be housed in the base 22 of the working mechanism 2 and be integrally movable. Alternatively, the entire controller 4 or a part thereof may be provided outside a housing of the working mechanism 2. In this case, the controller 4 may be connected to the working mechanism 2 in such a manner as to be able to transmit and receive information via a flexible cable or the like.

<Features of Embodiment>

A general automation apparatus that is currently being used controls numerical values in such a manner as to move an end effector that conducts predetermined work to an arbitrary coordinate position in its own machine coordinate system XYZ preset with reference to the mechanical location of the mechanism (and further to orient the end effector in an arbitrary attitude direction).

However, on an actual worksite such as a plant, the work W targeted to cause the working mechanism 2 (and the end effector 21 thereof) to conduct work moves in many cases in a predetermined motion rule (motion) in a machine coordinate system of another machine (hereinafter referred to as the "other machine coordinate system"; not particularly illustrated) set irrespective of its own machine coordinate system XYZ. For example, in the embodiment, the work W is transferred and moved on the belt conveyor 5 configured as a separate body from the working mechanism 2.

Hence, when the working mechanism 2 is installed on a worksite, a placement error between the other machine coordinate system being a reference of the travel of the work W and its own machine coordinate system XYZ of the working mechanism 2 is corrected (calibrated) mechanically or in terms of a coordinate computation. Furthermore, target position designation work in accordance with the travel of the work W based on the predetermined motion rule is conducted on the working mechanism 2. However, such an inter-coordinate correction and target position designation work require skilled techniques, high expert knowledge, special jigs, and many working steps. Hence, the work is very complicated. Moreover, on the other hand, a use method of highly frequently repeating the installation and removable of a working mechanism configured in such a manner as to be movable itself, like the working mechanism 2 of the example of the embodiment, on and from various worksites has been proposed in recent years. Therefore, versatility and adaptability that allow work to be easily started on any kind of worksite is desired for the working mechanism.

In contrast, the automation apparatus of the embodiment includes the working mechanism 2, the camera 3, the position detector 41, and the work controller 42. The working mechanism 2 can conduct predetermined work on the work W that exists in an arbitrary position in its own machine coordinate system XYZ set in the workable space area. The camera 3 optically detects the work W existing in its own machine coordinate system XYZ. The position detector 41 can detect the current position information of the work W in its own machine coordinate system XYZ as of this point in time, on the basis of the detection information (image information) of the camera 3. The work controller 42 commands a working position of the working mechanism 2 on the basis of a plurality of pieces of current position information of the same work W that travels in its own machine coordinate system XYZ, the plurality of pieces of current position information having been detected by the position detector 41 at a plurality of different detection timings.

Consequently, the work controller 42 can command a working position of the working mechanism 2 in accordance with the moving motion of the work W in its own machine coordinate system XYZ, on the basis of the plurality of pieces of current position information detected by the position detector 41. Furthermore, the work controller 42 can cause, for example, the end effector 21 of the working mechanism 2 to capture the work W in this working position. This corresponds to the automatic recognition of the predetermined motion rule of the work W in terms of the travel of the work W. Therefore, there is no need to consider a placement error between its own machine coordinate system XYZ and the other machine coordinate system of the outside. Hence, the necessity of the target position designation work and the inter-coordinate correction work in accordance with the predetermined motion rule of the work W for the working mechanism 2 is eliminated. Hence, the adaptability of the working mechanism 2 to a work environment where the work W travels can be improved. A method for realizing the above functions is described in turn below.

<Detailed Configurations of Position Detector and Work Controller>

Figure 2:
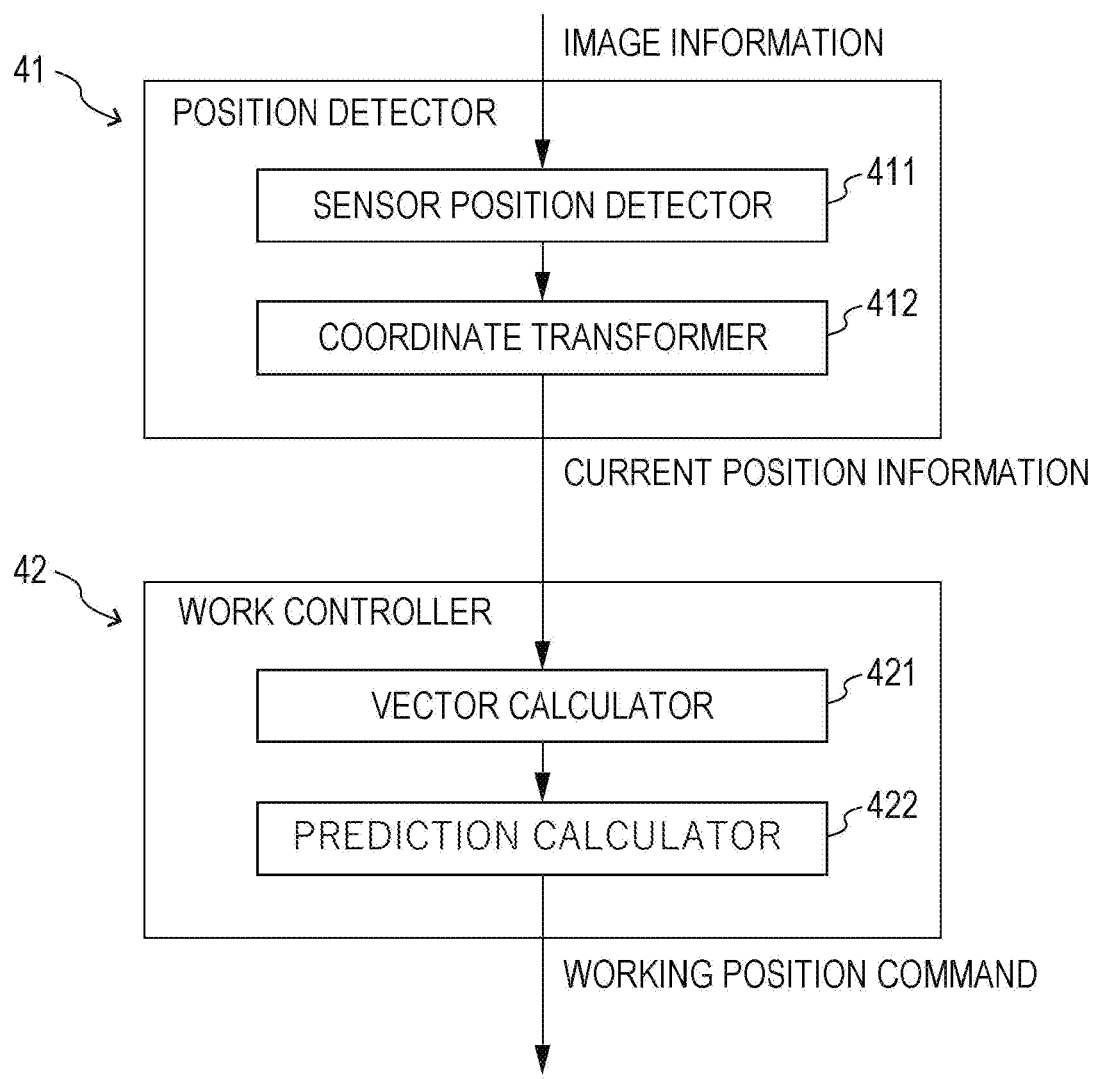
FIG. 2 represents an example of a software block diagram of a position controller and a work controller included in a controller (processor)

FIG. 2 represents an example of software blocks of the position detector 41 and the work controller 42, which are included in the controller 4. In FIG. 2, the position detector 41 includes a sensor position detector 411 and a coordinate transformer 412.

The camera 3 is an optical sensor configured as a separate body from a main body of the working mechanism 2. The image information captured by the camera 3 (a two-dimensional image of a target environment including a work of this example) is acquired as two-dimensional pixel array data in a camera coordinate system XcYc (a sensor coordinate system) set uniquely in the camera 3.

Hence, the sensor position detector 411 detects the current position information of the work W captured in the image information captured by the camera 3 as position information in the camera coordinate system XcYc set uniquely in the camera 3, on the basis of the image information. It is simply required to apply a known image recognition algorithm to the internal processing of the sensor position detector 411. A detailed description thereof is omitted here (of them, a specific example of a case where a neural network that has learned in a machine learning process by deep learning is applied is described in detail below).

The coordinate transformer 412 then transforms the current position information of the work W in the camera coordinate system XcYc detected by the sensor position detector 411 into current position information in its own machine coordinate system XYZ on the basis of the position and attitude of the camera 3, and outputs the current position information. In the example of the embodiment, a setting position (Cp (Xp, Yp Zp): refer to FIG. 1) of the camera 3 in its own machine coordinate system XYZ, and a setting attitude (Dc: refer to FIG. 1) of the camera 3 including the image-capture direction are fixed at known values. Consequently, the processing content of the coordinate transformer 412 is simply required to be a coordinate transformation from the camera coordinate system XcYc into its own machine coordinate system XYZ by a known linear mapping method. The detailed description is omitted here.

In the embodiment, the camera 3 captures image information periodically at predetermined time intervals. The position detector 41 chronologically detects a plurality of pieces of current position information on the same travelling work W at a plurality of different detection timings in accordance with an image-capture period of the camera 3.

Moreover, as illustrated in FIG. 2, the work controller 42 includes a vector calculator 421 and a prediction calculator 422.

The vector calculator 421 calculates a moving speed vector per unit time of the work W travelling in its own machine coordinate system XYZ, on the basis of the plurality of pieces of current position information detected by the position detector 41. The moving speed vector is information also including the moving direction of the work W, and is outputted as numerical information in its own machine coordinate system XYZ.

The prediction calculator 422 then calculates a predicted position of the same work W on the basis of the calculated moving speed vector with any one of the plurality of pieces of current position information detected for the work W as a base point. The predicted position is a position at one point on a travel path where the work W passes in the future. The prediction calculator 422 also calculates an arrival timing when the work W reaches the predicted position together.

The work controller 42 then commands (outputs) the predicted position in its own machine coordinate system XYZ as the working position. Furthermore, the work controller 42 causes the end effector 21 of the working mechanism 2 to start work at the arrival timing via a not particularly illustrated, separate control path. In the example of the embodiment, the work of the end effector 21 is the work of lowering and pressing the stamp. Hence, the work controller 42 outputs a lowering operation command to the elevating-lowering shaft of the SCARA mechanism with the arrival timing as a work start timing of the end effector 21.

<Specific Example of Work Control Contents>

Here, the work control contents of the work controller 42 are specifically described with reference to FIGS. 3 to 7. In FIGS. 3 to 6 below, for convenience of simplification of description, it is assumed that an X-axis direction of its own machine coordinate system XYZ, an Xc-axis direction of the camera coordinate system XcYc, and the travel direction of the belt conveyor 5 all agree with each other. Furthermore, it is assumed that the camera 3 is fixed in a position and an attitude that allow the camera 3 to overlook the belt conveyor 5 from above. Moreover, it is assumed that a height dimension from the floor surface of a transfer surface (a belt top surface) of the belt conveyor 5 (a height position of the transfer surface in its own machine coordinate system XYZ, a spaced distance between the transfer surface and the camera position) is known. Consequently, the travel of the work W in its own machine coordinate system XYZ can be simply handled by being integrated into a coordinate value on the X axis. Moreover, in the illustration of image information, an image captured in the past (a past image) and an image captured in the future (a future image), together with an image captured at the current time (a current image), are also overlaid and displayed if necessary.

Figure 3:
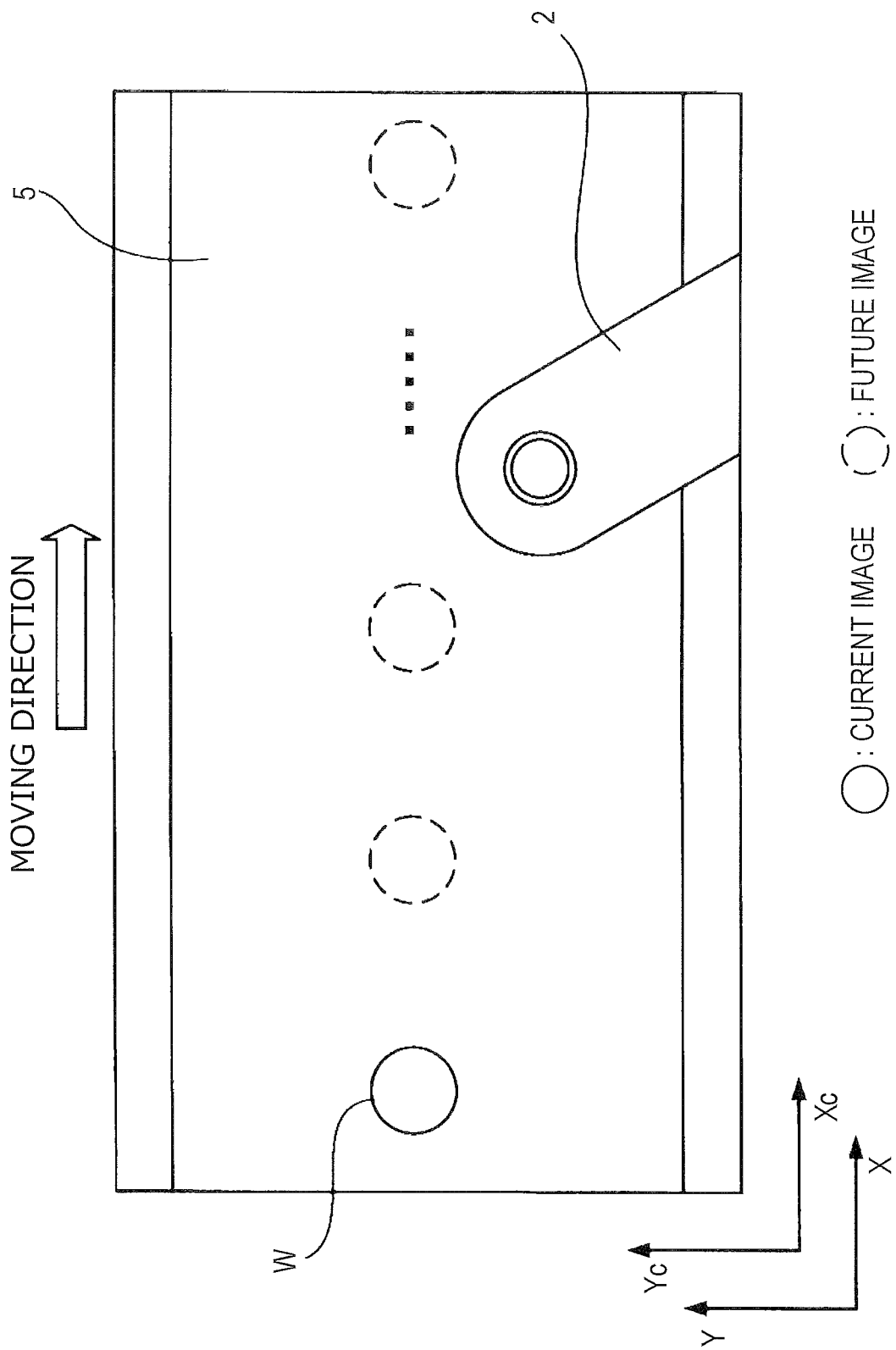
FIG. 3 represents an example of image information captured by a camera.

FIG. 3 represents an example of the image information captured by the camera 3. In the illustrated example, the belt conveyor 5 transfers the work W linearly at a constant speed in a direction from left to right (a positive direction of the Xc axis of the camera coordinate system XcYc). The camera 3 captures an image of the same travelling work W at predetermined intervals. Hence, an image of the work W located at the left end in the first image information (the current image illustrated by a solid line in FIG. 3) is captured in a location where the work W is displaced to the right at regular intervals in the image information to be captured subsequently and successively (the future images illustrated by broken lines of FIG. 3).

Figure 4:
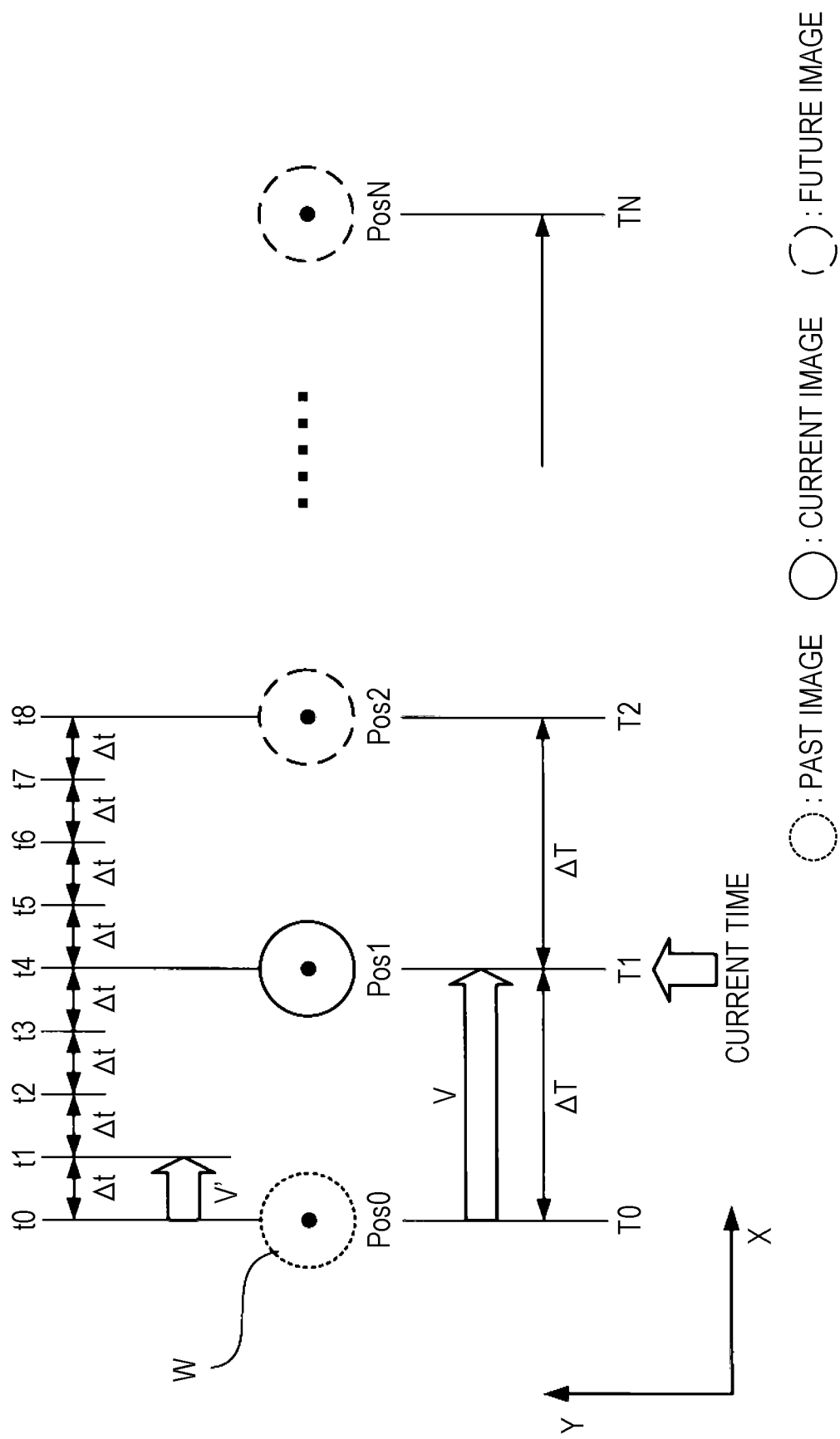
FIG. 4 represents a motion rule of the linear constant speed travel of a work.

Such a motion rule (motion) of the linear constant speed travel of the work W can be represented as in FIG. 4. In an example illustrated in FIG. 4, an image of the work W is captured first (at T0) in the leftmost end position Pos0 (the past image illustrated by a dotted line in FIG. 4). An image of the work W is then captured in a position Pos1 (the current image illustrated by a solid line in FIG. 4) after the passage of an image-capture time interval ΔT of the camera 3 (T1). Images of the work W are then successively captured in positions Pos2, PosN (the future images illustrated by dotted lines in FIG. 4) (T2, . . . , TN). The sensor position detector 411 recognizes the appearance of the work W in each piece of the captured image information, and detects the current position information of the work W (the center position of the work W in this example) in the camera coordinate system XcYc. The coordinate transformer 412 transforms each piece of the current position information in the camera coordinate system XcYc into current position information in its own machine coordinate system XYZ.

At time T1 (the current time) when the current position information in Pos1 is detected, the vector calculator 421 of the work controller 42 obtains a difference between the current position information as of time T1 (the current time) and current position information in Pos0 at the immediately preceding time T0, on the basis of the second image information. The vector calculator 421 calculates a moving speed vector V on the basis of the difference. In this example, a position deviation vector obtained by subtracting an X-axis coordinate position of Pos0 from an X-axis coordinate position of Pos1 in its own machine coordinate system XYZ is the moving speed vector V. The moving speed vector V represents the moving speed of the work W per unit time that is the image-capture time interval ΔT of the camera 3 (the sensor detection period), and the moving direction of the work W. The moving speed vector V can be calculated when the second and later current position information is detected. In other words, the moving speed vector V can be obtained from the position deviation vector obtained by subtracting the immediately preceding current position information from the latest current position information.

Moreover, the unit time of the moving speed vector V is not limited to the above-mentioned camera image-capture time interval ΔT. The work controller 42's control cycle (the work controller's control period) Δt that is generally shorter in time interval than the camera image-capture time interval ΔT may be set as a unit time of a moving speed vector V'. In this case, the position deviation vector is divided by a unit time ratio (ΔT/Δt) to enable the calculation of the moving speed vector V.

Figure 5:
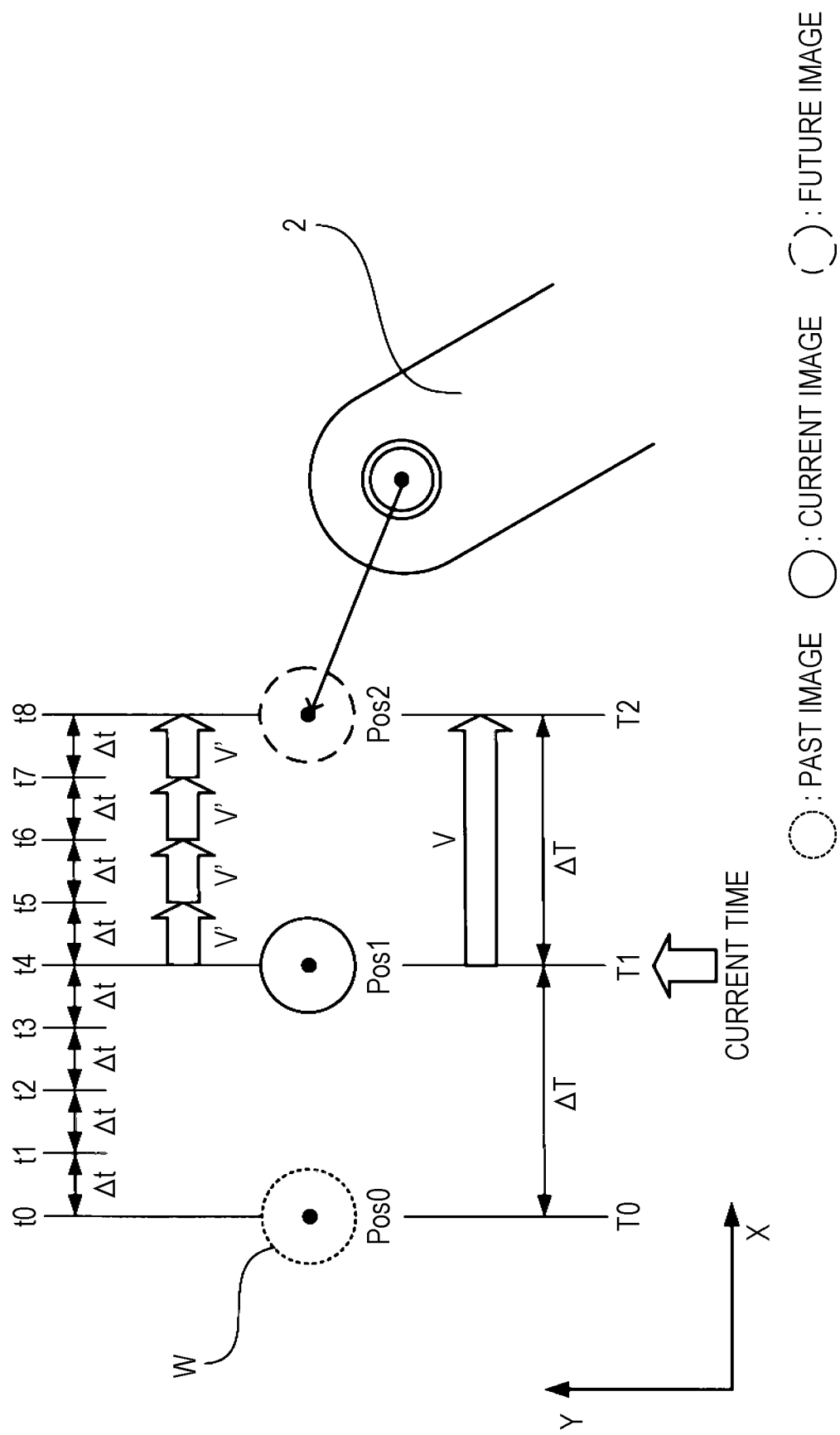
FIG. 5 represents a predicted position and an arrival timing of the work that are calculated by a prediction calculator.

As illustrated in FIG. 5, the prediction calculator 422 then predicts the arrival of the work W in the position Pos2, which is an addition of the moving speed vector V and the current position information in Pos1 at the current time, at an arrival timing that is time T2 when the camera image-capture time interval ΔT has passed from the current time T1, and outputs a corresponding working position command. The prediction calculator 422 may judge that it is difficult to move the end effector 21 to the position Pos2 before the arrival timing T2, considering the position and movable speed of the end effector 21 of the working mechanism 2 as of this point in time (the current time T1). In this case, the prediction calculator 422 outputs a working position command corresponding to the position PosN and the arrival timing TN in this position that can be judged to be in time at T2 or later. In this case, the prediction calculator 422 may output a working position command, using the moving speed vector V' with the control cycle Δt of the work controller 42 that is shorter in time interval as the unit time. Consequently, control accuracy is improved, and also the time before the start of work can be reduced.

Figure 6:
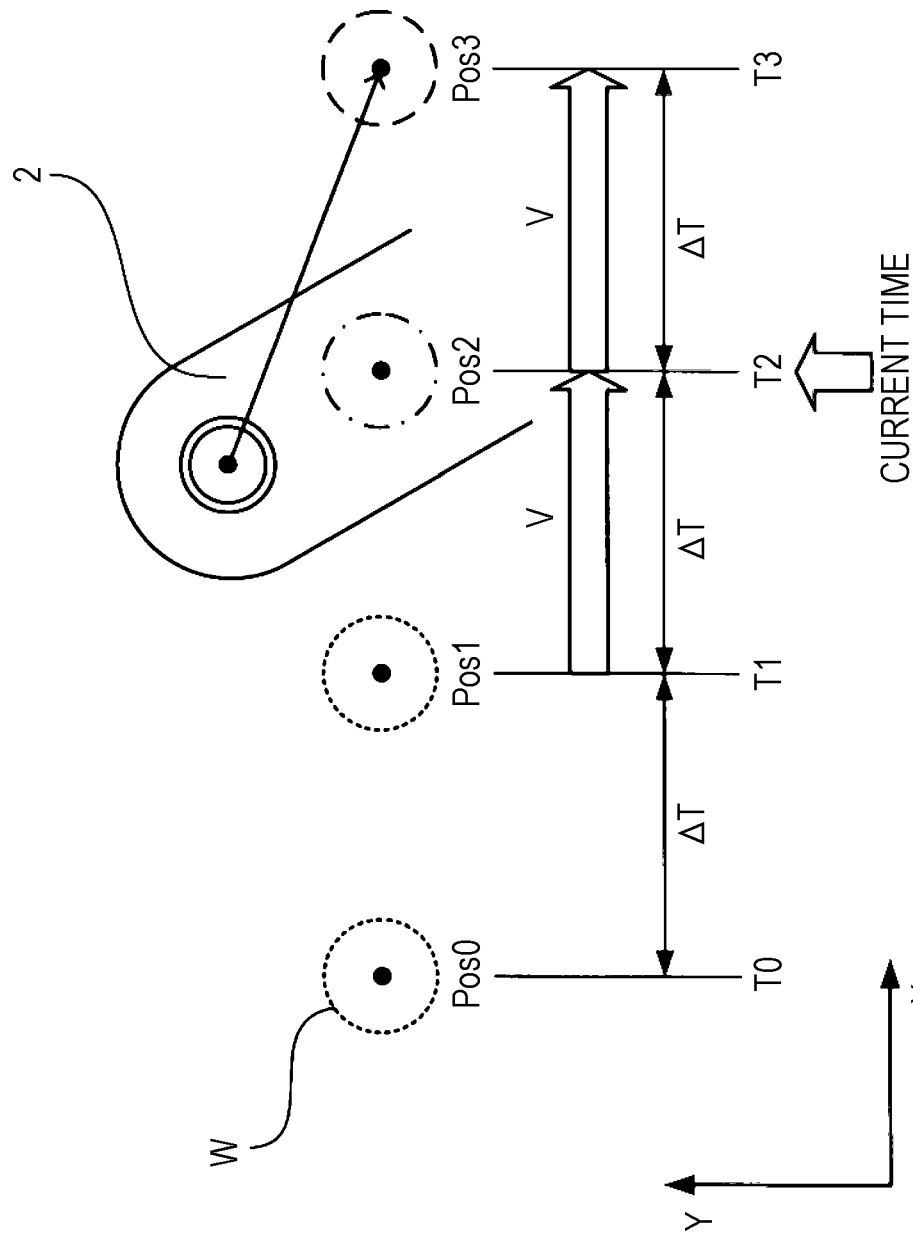
FIG. 6 is a diagram for explaining a method for coping with a case where the detection of current position information fails.
Figure 7:
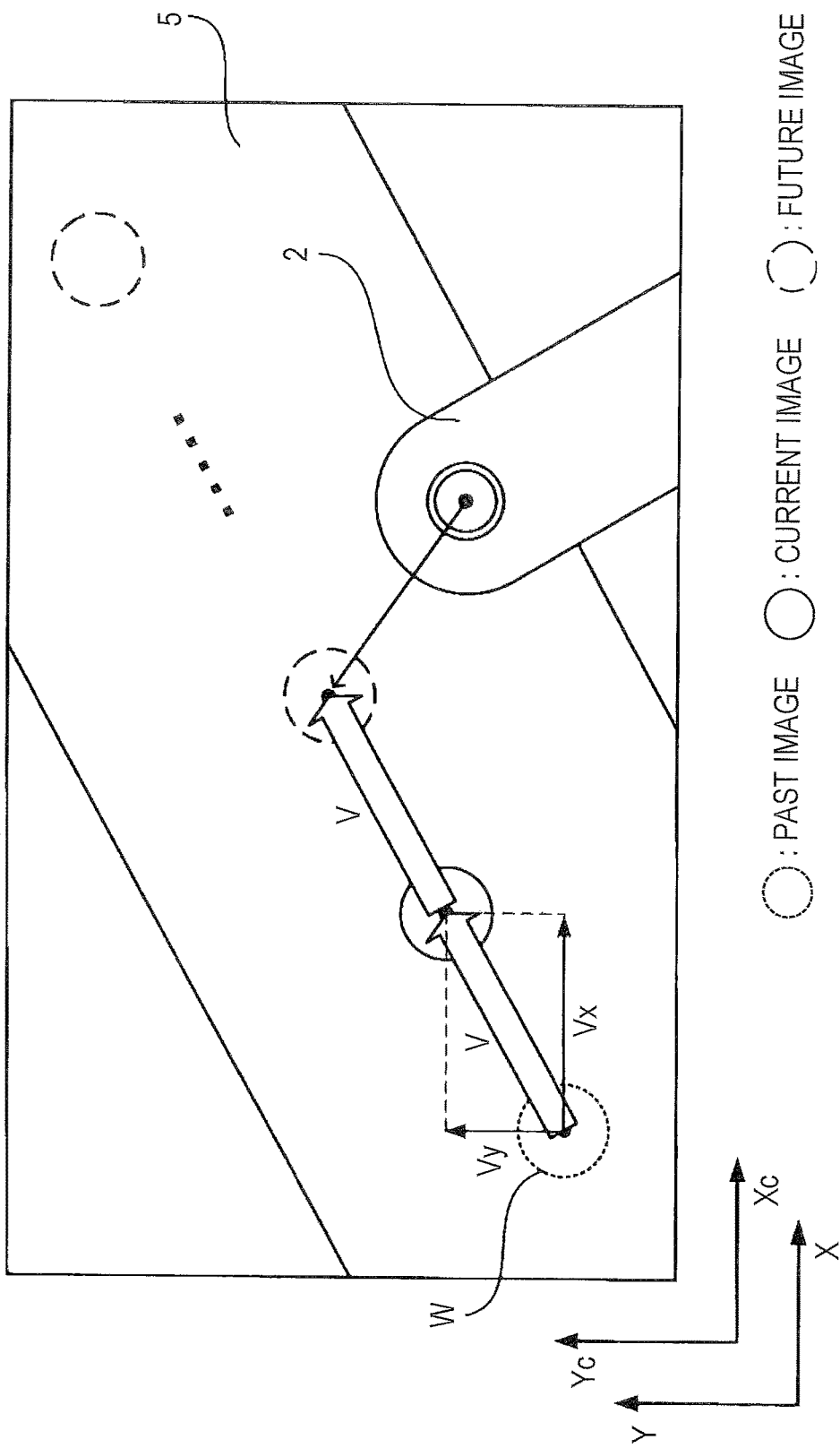
FIG. 7 represents an example of image information in a case where a moving direction of the work is inclined with respect to a camera coordinate system.

Moreover, as illustrated in FIG. 6, the camera 3 may not be able to capture an image of the work W due to a superposition of the arm of the working mechanism 2 above the work W, and fail in detection of the current position information of the work W as of this point in time. In this case, the prediction calculator 422 may calculate a predicted position and an arrival timing in this position, using a plurality of other pieces of the current position information, which succeeded previously in detection, of the same work W, and the moving speed vector V calculated on the basis of these pieces. For example, even if an image of the work W (a current lost image illustrated by a dot-and-dash line in FIG. 6) cannot be captured in the position Pos2 at the current time T2 in FIG. 6, the prediction calculator 422 can calculate a predicted position and an arrival timing with the nearest Pos1 where the current position information could be detected as a base point, using the moving speed vector V obtained from the previous position deviation vector between Pos0 and Pos1. Specifically, the prediction calculator 422 may set, as the predicted position, a position obtained by adding the moving speed vector V to the position Pos1, for example, twice. Furthermore, the prediction calculator 422 may set, as the arrival timing, the time (T3) when the unit time (the camera image-capture time interval ΔT) passed from the current time T2. The failure itself in the detection of the current position information of the work W due to the above cause can be easily recognized from the placement relationship between the position of the arm of the working mechanism 2 in its own machine coordinate system XYZ and the previously predicted position of the work W. However, even if the detection of the current position information of the work W fails due to an external factor other than the above cause (for example, the image-capture direction of the camera 3 is momentarily blocked), the predicted position and arrival timing of the work W can be calculated by the above coping method.

The work control contents described above are based on the premise that the X-axis direction of its own machine coordinate system XYZ, the Xc-axis direction of the camera coordinate system XcYc, and the travel direction of the belt conveyor 5 agree with each other. However, for example, as illustrated in an image information example of FIG. 7, the travel direction of the belt conveyor 5 is inclined with respect to its own machine coordinate system XYZ and the camera coordinate system XcYc in many cases on an actual worksite (especially in a case where the working mechanism 2 itself has a movable configuration as in the example of the embodiment) (in the example illustrated in FIG. 7, the X- and Y-axis directions of its own machine coordinate system XYZ agree with the Xc- and Yc-axis directions of the camera coordinate system XcYc). However, also in this case, the prediction calculator 422 can calculate the predicted position and arrival timing of the work W by a method similar to the above by calculating an X-axis direction component Vx and a Y-axis direction component Vy of the moving speed vector V together. Consequently, the prediction calculator 422 can output a corresponding working position command.

Moreover, there is also a case of a placement relationship where its own machine coordinate system XYZ and the camera coordinate system XcYc are inclined with respect to each other (not particularly illustrated). Also in this case, the setting position (Cp (Xp, Yp, Zp): refer to FIG. 1) of the camera 3 and the setting attitude (Dc: refer to FIG. 1) of the camera 3 including the image-capture direction in its own machine coordinate system XYZ are known, the coordinate transformer 412 transforms coordinates, reflecting the setting position Cp and the setting attitude Dc of the camera 3, and accordingly can detect the current position information of the work W in its own machine coordinate system XYZ. Moreover, even if the setting position Cp and the setting attitude Dc of the camera 3 are movable, as long as the setting position Cp and the setting attitude Dc of the camera 3 in its own machine coordinate system XYZ can be detected with a sensor such as an encoder or linear scale, a coordinate transformation that is reflective of them is similarly possible (not particularly illustrated).

The height dimension from the floor surface of the transfer surface (the belt top surface) of the belt conveyor 5 (the height position of the transfer surface in its own machine coordinate system XYZ, a spaced distance between the transfer surface and the camera position) may be unknown. In this case, for example, a laser scanner (not particularly illustrated) provided separately to the camera 3 may detect the spaced distance between the transfer surface and the camera position. Furthermore, the coordinate transformer 412 may detect current position information also including the height position (Z-axis direction coordinate position) of the work W in its own machine coordinate system XYZ, on the basis of the detection result.

Moreover, if images of a plurality of the works W are captured in the image information, the position detector 41 may identify the works W individually, and detect their current position information. The work controller 42 may then output work position commands related to the works W sequentially (not particularly illustrated).

<Effects of Embodiment>

As described above, the automation apparatus 1 of the embodiment includes the working mechanism 2 that can conduct predetermined work on the work W existing in an arbitrary position in its own machine coordinate system XYZ set in the workable space area, and the camera 3 that detects the work existing in its own machine coordinate system XYZ. The automation apparatus 1 further includes the position detector 41 that can detect the current position information of the work W in its own machine coordinate system XYZ as of this point in time, and the work controller 42 that outputs a working position command of the working mechanism 2 on the basis of a plurality of pieces of current position information of the same work W travelling in its own machine coordinate system XYZ, the plurality of pieces of current position information having been detected by the position detector 41 at a plurality of different detection timings, on the basis of the image information captured by the camera 3.

Consequently, the work controller 42 can command a working position of the working mechanism 2 in accordance with the travel motion of the work W in its own machine coordinate system XYZ, on the basis of the plurality of pieces of current position information detected by the position detector 41. Furthermore, the work controller 42 can cause, for example, the end effector 21 (the stamp) of the working mechanism 2 to capture the work W in the working position. This corresponds to the automatic recognition of the motion rule of the work W in terms of the travel of the work W. Therefore, there is no need to consider the placement error between its own machine coordinate system XYZ and the other machine coordinate system of the outside (for example, a machine coordinate system set in the belt conveyor 5). Hence, the necessity of the target position designation work and the inter-coordinate correction work in accordance with the motion rule of the work W on the working mechanism 2 is eliminated. Hence, the adaptability of the working mechanism 2 to a work environment where the work W travels can be improved.

Figure 8:
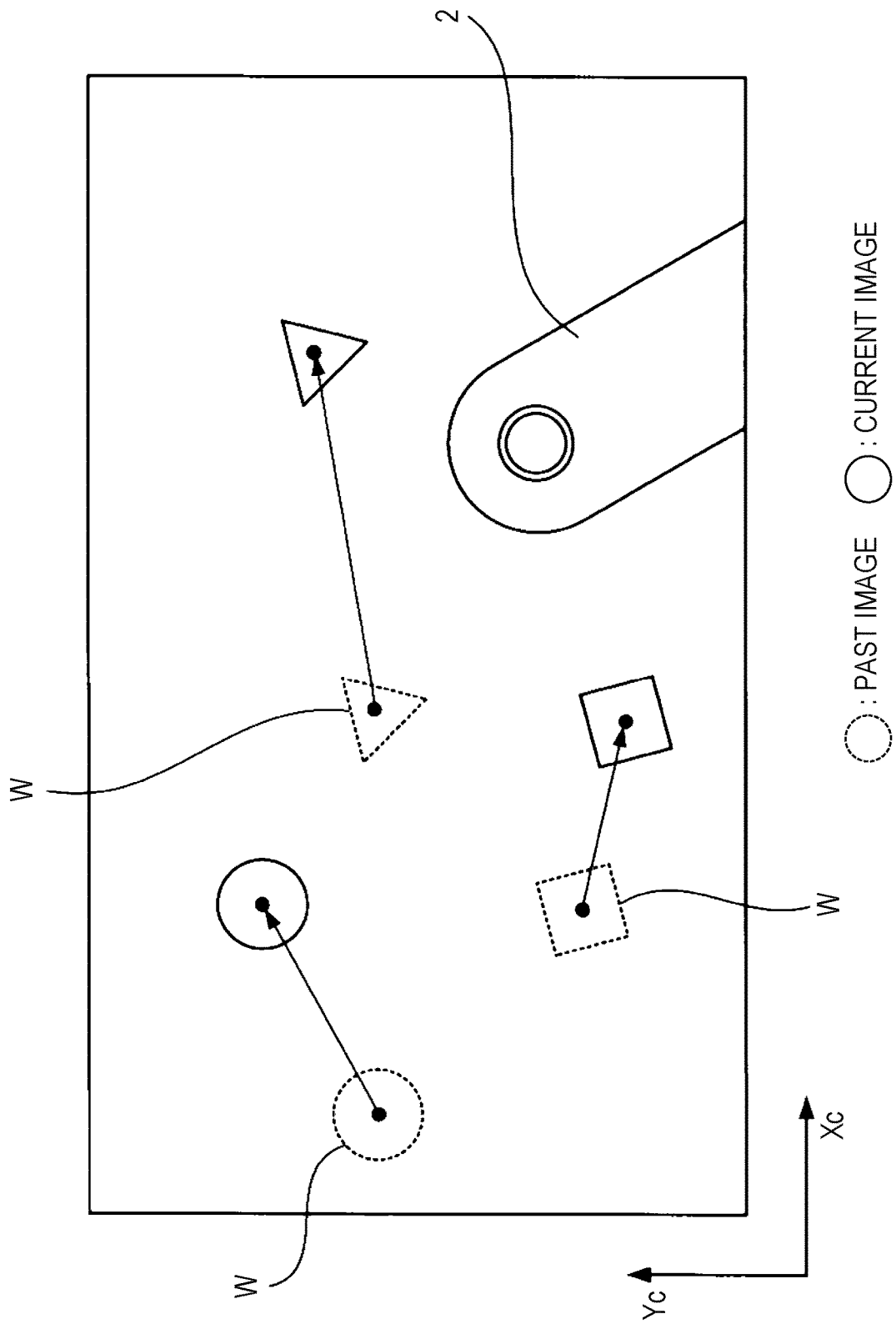
FIG. 8 represents an example of image information in a case where images of a plurality of different works having different external shapes and motion rules, respectively, are captured.

A motion rule (motion: moving direction, moving speed, and travel timing) of each work W can be recognized in the embodiment. Hence, for example, as illustrated in FIG. 8, even if a plurality of the works W passes the workable space area of the working mechanism 2 in their respective different motion rules, the working mechanism 2 can capture the works W. Moreover, as illustrated, even if the external shapes of the plurality of the works W are different from each other, the position detector 41 can recognize the works W individually in images and detect their current position information by preregistering (learning) the external shapes of the works W in the position detector 41.

Moreover, in the embodiment, especially the work controller 42 includes the vector calculator 421 and the prediction calculator 422. The vector calculator 421 calculates a moving speed vector V per unit time of the same work W traveling in its own machine coordinate system XYZ, on the basis of a plurality of pieces of current position information of the work W detected by the position detector 41 at a plurality of different detection timings. The prediction calculator 422 calculates the predicted position of the work W on the basis of the moving speed vector V with any piece of the current position information as a base point. The work controller 42 commands the calculated predicted position as the working position of the working mechanism 2. Consequently, a predicted position on the pass to which the work W travels in the future can be predicted on the basis of the moving speed vector V as of this point in time. Furthermore, for example, the end effector 21 of the working mechanism 2 is moved to this predicted position to enable the capture of the work W.

Moreover, in the embodiment, especially the prediction calculator 422 also calculates an arrival timing of the work W in the predicted position. The work controller 42 commands the arrival timing as the work start timing of the working mechanism 2 (the end effector 21). Consequently, instantaneous synchronization work such as a printing process, holding operation, or processing process of, for example, the end effector 21 on the travelling work W can also be conducted at an accurate timing.

Moreover, in the embodiment, especially the prediction calculator 422 predicts the predicted position with another piece of the current position information that has succeeded in detection, as a base point, even if the position detector 41 fails in the detection of the current position information of the work W. Consequently, for example, even if the camera 3 loses sight of the work W temporarily due to the overlapping of the work W and the working mechanism 2, the prediction calculator 422 can predict the predicted position by complementing the current position information with another piece of the current position information.

Moreover, in the embodiment, especially the vector calculator 421 calculates the moving speed vector V with the camera image-capture time interval ΔT of the camera 3 as the unit time. Consequently, a predicted position and an arrival timing can be calculated in the detection period of the current position information of the work W. Furthermore, the capture of the work W with, for example, the end effector 21 can also be checked by image capture of the camera 3 at the same timing.

Moreover, in the embodiment, especially the vector calculator 421 may calculate the moving speed vector V with the control period of the work controller 42 as the unit time. In this case, the vector calculator 421 can calculate the moving speed vector V in a control period that is relatively shorter than the camera image-capture time interval ΔT of the camera 3, and accordingly calculate a predicted position (such as a position as of t5, t6, t7, or the like in FIG. 5 above) and an arrival timing with high resolution.

Moreover, in the embodiment, especially the camera 3 that optically captures a two-dimensional image of a target environment including the work W is included as a sensor. Consequently, it becomes possible to detect current position information, using image recognition based on the two-dimensional image.

The use of a high-definition camera having a wide-angle lens with low distortion as the camera 3 is suitable. Consequently, the existence and current position information of the work W located relatively far can be quickly detected with a wider angle of view.

Moreover, in the embodiment, especially the position detector 41 detects the current position information of the work W in its own machine coordinate system XYZ by image recognition based on the two-dimensional image. Consequently, the position detector 41 can also handle the works W of various appearances (shape, color, and pattern) flexibly, and detect their positions and attitudes.

Moreover, in the embodiment, especially the setting position Cp and the setting attitude De of the camera 3 in its own machine coordinate system XYZ are known (if known, a movable type is also practical). The position detector 41 includes the sensor position detector 411 and the coordinate transformer 412. The sensor position detector 411 detects the current position information of the work W in the camera coordinate system XcYc set separately in the camera 3, on the basis of the image information captured by the camera 3. The coordinate transformer 412 transforms the current position information in the camera coordinate system XcYc into current position information in its own machine coordinate system XYZ, on the basis of the setting position Cp and the setting attitude Dc of the camera 3. Consequently, the coordinate transformation process from the camera coordinate system XcYc of the camera 3 into its own machine coordinate system XYZ can also be automatically performed. Therefore, the current position information of the work W available for the work control of the working mechanism 2 can be easily detected from the image information of the camera 3.

Moreover, in the embodiment, especially the entire working mechanism 2 is configured in such a manner as to be movable. Its own machine coordinate system XYZ is set with reference to the mechanical location of the working mechanism 2. Consequently, arbitrary installation and removal of the working mechanism 2 on and from various construction sites can be easily performed. The application of the working mechanism control of the embodiment to the use form of such a highly versatile working mechanism 2 is especially suitable.

<Modifications>

The above-described embodiment can be modified in various manners within the scope that does not depart from the gist and technical idea thereof.

<Modification 1: Case of Follow-Up Control with Current Position Information as it is as Working Position>

Figure 9:
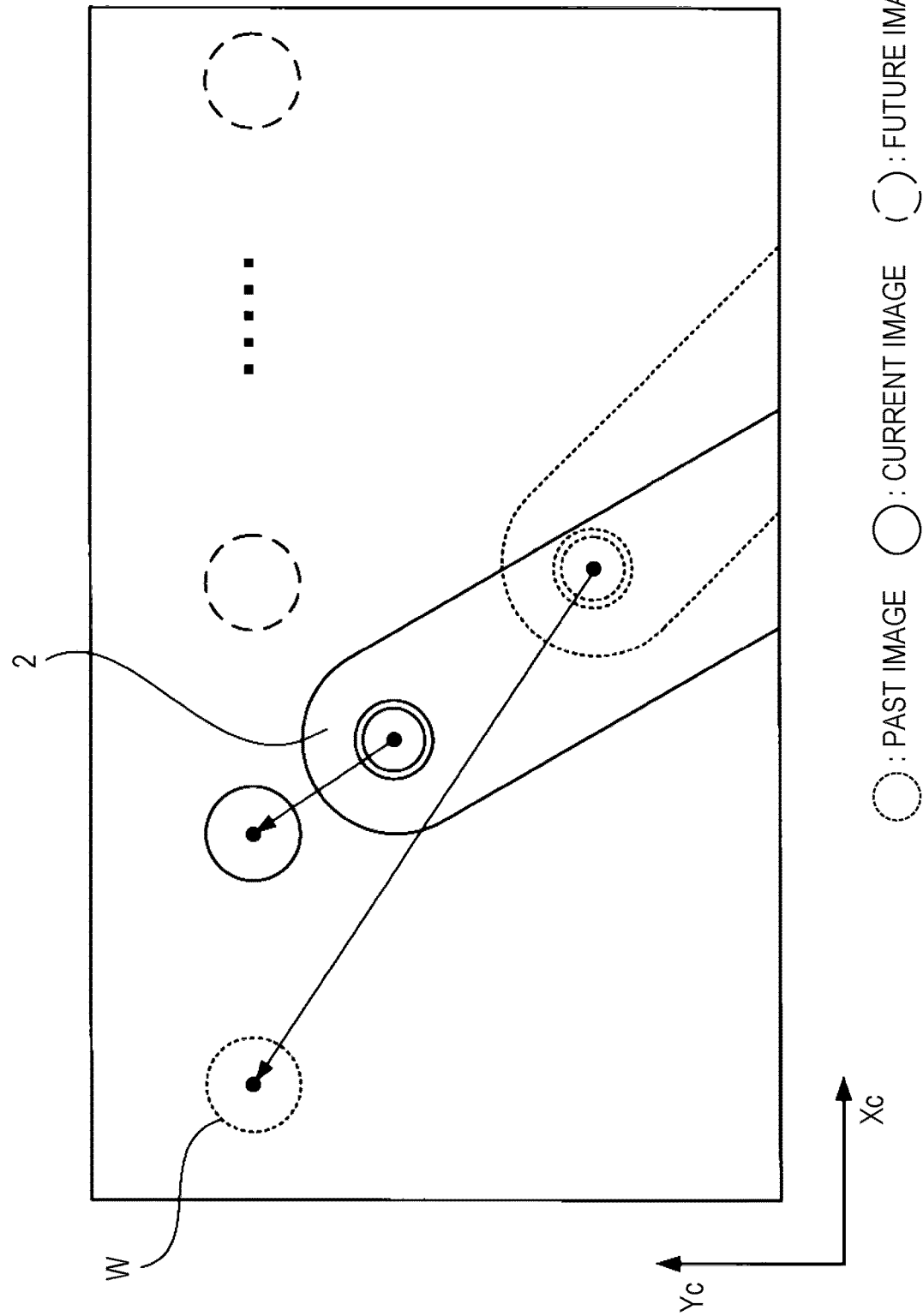
FIG. 9 represents an example of the operation of a working mechanism in a case where the current position information is outputted as it is as a working position command.

In the embodiment, the moving speed vector V in accordance with a motion rule of the same work W is obtained from a plurality of pieces of current position information obtained in chronological order for the work W. Furthermore, a future predicted position and arrival timing of the work W, which are predicted on the basis of the moving speed vector V, are outputted as the working position command of the working mechanism 2. Instead of this, for example, the work controller 42 may command the current position information detected by the position detector 41 successively as it is as the working position of the working mechanism 2. Also in this case, as illustrated in FIG. 9, the working mechanism 2 can move, for example, the end effector 21 in such a manner as to follow the pieces of current position information successively detected for the same work W as they are. As a result, the end effector 21 of the working mechanism 2 can capture the work W.

<Modification 2: Case of Also Coping with Time-Varying Moving Speed and Moving Direction>

In the embodiment, a description is given of the example of application of the technology of the present disclosure to the case where the work W travels in the motion rule of the linear constant speed by the transfer on the belt conveyor 5. In addition, the technology of the present disclosure can also be applied to a case where the motion rule of the work W changes over time. In this case, two or more moving speed vectors V that are chronologically successive may be calculated. A time rate of change between them may be then estimated to calculate the moving speed vector V that appears in the future. Furthermore, a predicted position (travel path) and an arrival timing may be calculated on the basis of the moving speed vector V. Specifically, the vector calculator 421 may also calculate a time rate of change of the moving speed vector V. Furthermore, the prediction calculator 422 may calculate a predicted position and an arrival timing on the basis of the moving speed vector V and the time rate of change with any piece of the previously detected current position information as a base point. Consequently, a motion rule for the travel of the work where the moving speed or moving direction changes over time, for example, free fall or a circular path, can also be automatically recognized. Therefore, the capture control of the working mechanism 2 in accordance with such a motion rule becomes possible (not particularly illustrated).

<Modification 3: Case of Including Distance Measurement Sensor as Sensor>

In the embodiment, the camera 3 that captures a two-dimensional image is included as a sensor for detecting the existence itself of the work W. However, the sensor is not limited to the camera 3. Another example of the sensor includes a distance measurement sensor such as a laser scanner or an ultrasonic sensor although not particularly illustrated. The distance measurement sensor measures, as detection information, for example, a spaced distance from a measurement point on an outer periphery surface of a target environment including the work W. In this case, the distance measurement sensor such as a laser scanner or an ultrasonic sensor scans the workable space area (its own machine coordinate system XYZ) of the working mechanism 2, and measures spaced distances from many measurement points. The distance measurement sensor detects current position information of the work W having a specific shape, on the basis of a set of the spaced distance data. Consequently, the current position information of the work W can be detected even in a relatively dark ambient environment with a simpler configuration than the camera 3. As described above, the camera 3 and another sensor may be used together. The other sensor may be used to detect a relative positional relationship between the camera 3 and the work W in its own machine coordinate system XYZ.

<Modification 4: Case where Position is Detected by Deep Learning>

Figure 10:
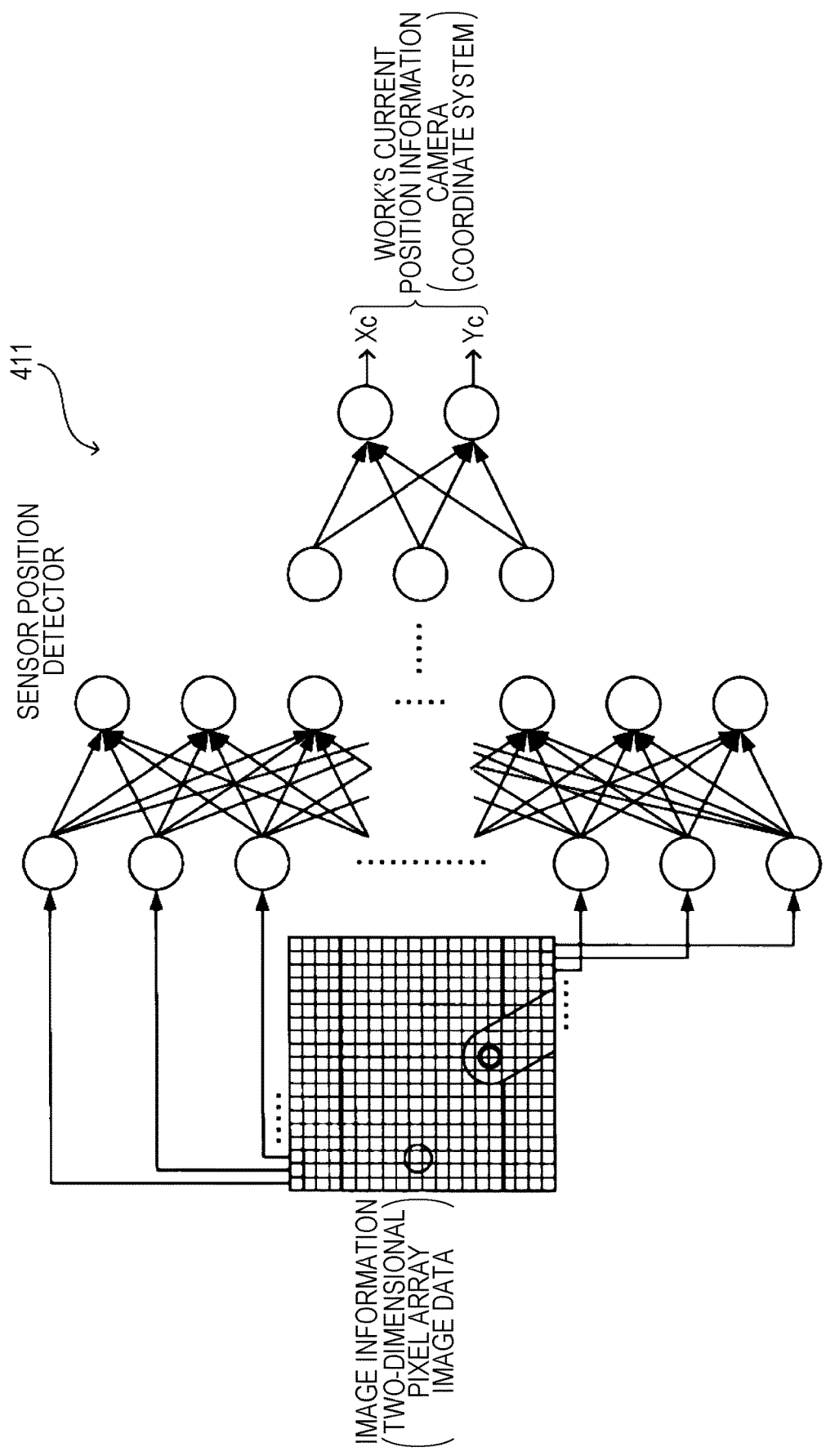
FIG. 10 represents an example of a model schematic diagram of a neural network implemented by a sensor position detector.

A description is given below of a specific example of the case where the sensor position detector 411 that performs the image recognition process, which is illustrated in the embodiment, implements a neural network W that has learned in the machine learning process by deep learning. FIG. 10 represents an example of a model schematic diagram of a neural network implemented by the sensor position detector 411.

In the model schematic diagram of the sensor position detector 411 illustrated in FIG. 10, the sensor position detector 411 is designed and adjusted in such a manner as to recognize the external shape of a specific work W learned in advance, on the basis of image information being two-dimensional pixel array data input from the camera 3, and further output current position information serving as a work reference point of the previously learned work W in the camera coordinate system XcYc (the coordinate system of the image information). The current position information outputted is based on the learning content of the machine learning process (deep learning). The current position information is a working position where it is estimated to appropriately conduct work (pressing the stamp in the example of the embodiment) in accordance with the appearance (shape and attitude) of the work W included in the image information. In other words, the neural network of the sensor position detector 411 has learned feature amounts representing the correlation between an external shape pattern of the work W and the current position information (the workable position), which are included in the image information.

In the neural network having the above basis specifications, for example, what is called a convolutional neural network (not particularly illustrated) that is a combination of a convolutional layer and a pooling layer may be configured to be the closest to an input layer. Consequently, flexible pattern recognition becomes possible. Moreover, for example, it is also suitable to configure a fully connected layer (not particularly illustrated) suitable for computation of an optimal value to be the closest to an output layer.

A neural network can learn by both of what is called supervised learning and reinforcement learning as the learning method of a neural network. For example, in a case of supervised learning, image information where the work W is placed in a known position in the camera coordinate system XcYc (the image information may be an actual captured image or a simulated image on a computer) may be input data. Furthermore, combined supervised data with the known work position as output data may be used. Many pieces of such supervised data may be used to perform learning by what is called a back-propagation process (an error back-propagation process). In this learning, a weight coefficient of each edge linking nodes is adjusted in such a manner that the relationship between an input layer and an output layer of each neural network holds. In addition to such back-propagation, various known learning methods such as what is called a stacked auto encoder, dropout, noise addition, and sparsity regularization may be used together to improve processing accuracy.

Moreover, in a case of reinforcement learning, an error amount (evaluation value) upon the working mechanism 2 conducting work in a random working position on the work W placed in a random position is detected. In order to reduce the error amount (in order to be able to obtain as much reward based on the evaluation value as possible in the future), the back-propagation process of the neural network is performed. Such learning work is repeated while randomness of the working position is successively adjusted, and accordingly the neural network of the sensor position detector 411 can learn feature amounts for the pattern recognition of the work W and outputting a working position appropriate for the pattern recognition, that is, the current position information. Such reinforcement learning may use what is called a known Q-learning algorithm. A detailed description thereof is omitted here.

In addition to the processing algorithm by deep learning using the illustrated neural network, the processing algorithm of the sensor position detector 411 may be another processing algorithm (not particularly limited) using, for example, a support vector machine or a Bayesian network.

Figure 11:
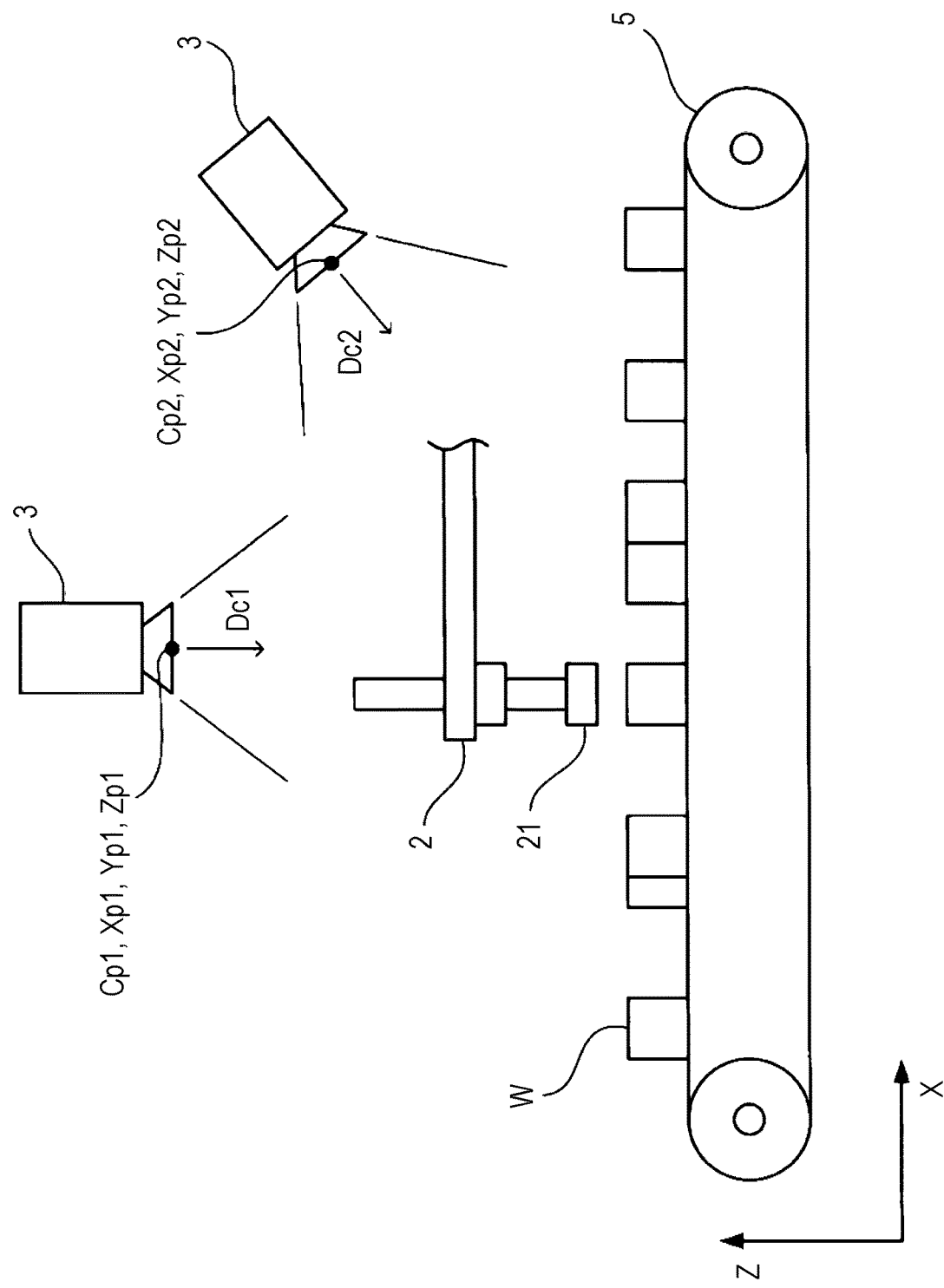
FIG. 11 represents an example of various installation positions and installation attitudes of the camera.

Moreover, as illustrated in FIG. 11, the image information used for the learning of the sensor position detector 411 is not limited to the image information captured by the camera 3 having a setting position Cp1 (Xp1, Yp1, Zp1) and a setting attitude Dc1 that allow the camera 3 to overlook the work W from above. The sensor position detector 411 may also learn together image information captured by the camera 3 having a setting position Cp2 (Xp2, Yp2, Zp2) and a setting attitude Dc2, the camera 3 being inclined with respect to the work W. Consequently, the sensor position detector 411 can output the current position information of the work W with excellent accuracy, using the image information captured by the camera 3 having the arbitrary setting position Cp and setting attitude Dc. Also in this case, if the setting position Cp and the setting attitude Dc of the camera 3 are known, the coordinate transformer 412 can output current position information in its own machine coordinate system XYZ.

Figure 12:
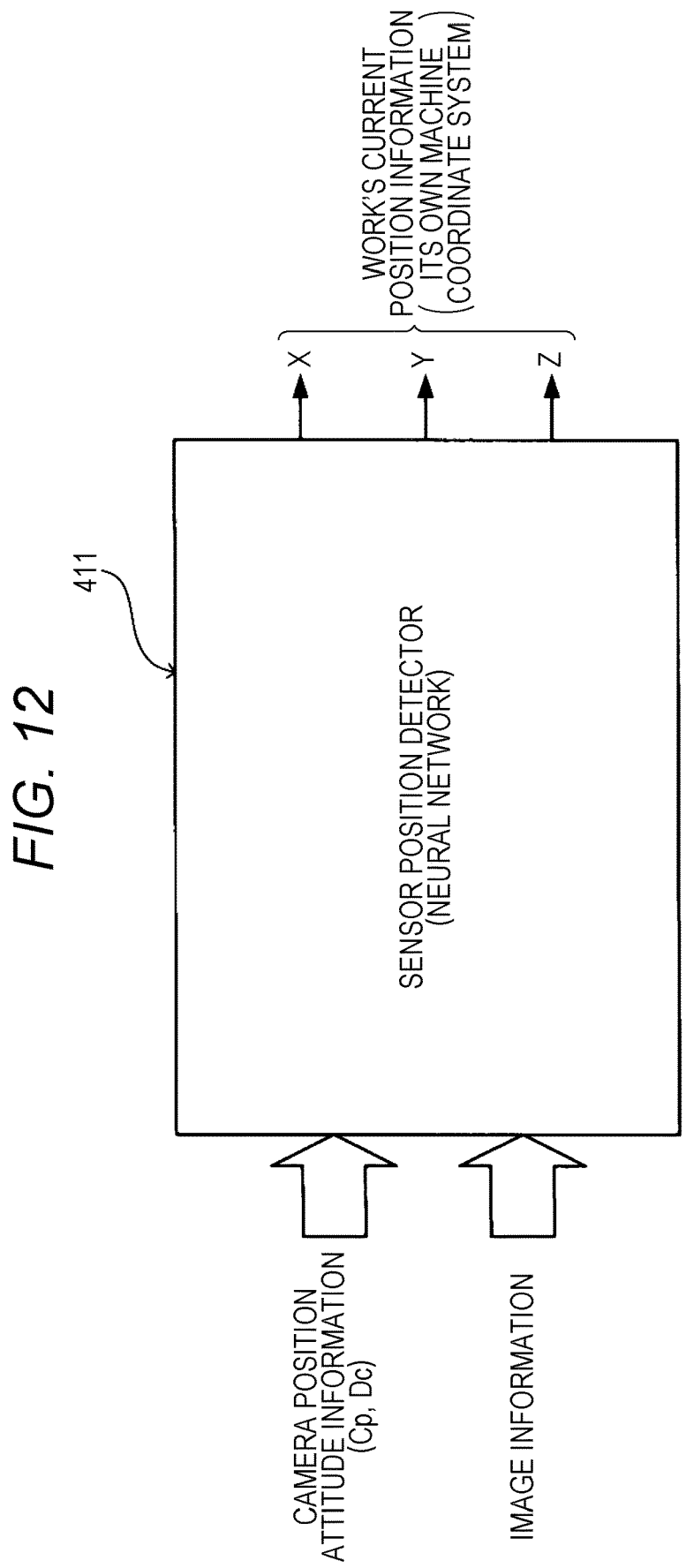
FIG. 12 represents an example of a model schematic diagram of a neural network that can output the current position information of the work in its own machine coordinate system.

Moreover, as illustrated in FIG. 12, the neural network (abbreviated in FIG. 12) of the sensor position detector 411 is designed and adjusted in such a manner that the current position information of the work W in its own machine coordinate system XYZ can be directly outputted by inputting image information and camera position attitude information including the setting position Cp and the setting attitude Dc of the camera 3. In this case, the coordinate transformer 412 of the position detector 41 can be omitted.

As described above, the automation apparatus 1 of the modification causes the sensor position detector 411 to previously learn (register) the external shape and the reference point position (current position information, working position) of the work W being a work target, and accordingly can capture the travelling work W without considering the placement relationship with another machine coordinate system of, for example, another transfer machine.

As described above, in the automation apparatus 1 of the modification, the setting position Cp and the setting attitude Dc of the camera 3 in its own machine coordinate system XYZ are known. The position detector 41 performs image recognition on the basis of a learning content in the machine learning process (for example, deep learning) that is reflective of the setting position Cp and the setting attitude Dc of the camera 3. Consequently, the appearance and current position information of the work W that are reflective of the setting position Cp and the setting attitude Dc of the camera 3 in its own machine coordinate system XYZ can be detected with high accuracy, not depending on a complicated artificial algorithm design, but by learning by, for example, learning data (training data) and/or simulation. Moreover, especially, in image recognition by, for example, deep learning, current position information as a three-dimensional coordinate position of the work W in its own machine coordinate system XYZ can be detected directly from a two-dimensional image not via the coordinate transformation process from the camera coordinate system XcYc.

<Modification 5: Others>

In the embodiment and the modifications, the SCARA mechanism is applied as the working mechanism 2. The working mechanism 2 is not limited to the SCARA mechanism. A not particularly illustrated, vertical multi-axis mechanism, Cartesian coordinate mechanism, and parallel link mechanism may be applied as the working mechanism 2.

When the above description includes expressions such as "perpendicular", "parallel", and "flat", these expressions do not strictly indicate "perpendicular", "parallel", "flat", and the like. In other words, design and manufacturing tolerances and errors are permitted in these expressions "perpendicular", "parallel", and "flat", which indicate "substantially perpendicular", "substantially parallel", and "substantially flat", respectively.

Moreover, when the above description includes expressions such as "identical", "same", "equal", and "different" in dimension, size, shape, position, and the like in terms of the appearance of a member, these expressions do not strictly indicate "identical", "same", "equal", "different", and the like. In other words, design and manufacturing tolerances and errors are permitted in these expressions "identical", "same", "equal", and "different", which indicate "substantially identical," "substantially same," "substantially equal", and "substantially different", respectively.

Moreover, in addition to those already described above, the methods of the embodiment and the modifications may be used in combination as appropriate. In addition, although specific illustrations are not presented, the embodiment and the modifications may be carried out by adding various changes thereto within the scope that does not depart from the gist of the technology of the present disclosure.

Embodiments of the present disclosure may be the following first to fifteenth automation apparatuses.

The first automation apparatus is characterized by including: a mechanism configured to be capable of conducting predetermined work on a work existing in an arbitrary position in its own machine coordinate system set within a workable space area; a sensor configured to detect the work existing in its own machine coordinate system; a position detector configured to be capable of detecting current position information of the work in its own machine coordinate system, on the basis of detection information of the sensor; and a work controller configured to command a working position of the mechanism on the basis of a plurality of pieces of current position information of the same work travelling in its own machine coordinate system, the plurality of pieces of current position information having been detected by the position detector at different detection timings.

The second automation apparatus is the first automation apparatus characterized in that the work controller commands the current position information detected by the position detector successively as the working position of the mechanism.

The third automation apparatus is the first automation apparatus characterized in that the work controller has a vector calculator configured to calculate a moving speed vector per unit time of the work travelling in its own machine coordinate system, on the basis of the plurality of pieces of current position information of the same work detected by the position detector at the different detection timings, and a prediction calculator configured to calculate a predicted position of the work, on the basis of the moving speed vector, with any piece of the current position information as a base point, and commands the predicted position as the working position of the mechanism.

The fourth automation apparatus is the third automation apparatus characterized in that the prediction calculator also calculates an arrival timing of the work in the predicted position, and the work controller commands the arrival timing as a work start timing of the mechanism.

The fifth automation apparatus is the fourth automation apparatus characterized in that the vector calculator also calculates a time rate of change of the moving speed vector, and the prediction calculator calculates the predicted position and the arrival timing of the work in the predicted position, on the basis of the moving speed vector and the time rate of change, with any piece of the current position information as the base point.

The sixth automation apparatus is any of the third to fifth automation apparatuses characterized in that the prediction calculator predicts the predicted position with another piece of the current position information that has succeeded in detection as the base point even upon the position detector failing in detection of the current position information of the work.

The seventh automation apparatus is any of the third to sixth automation apparatuses characterized in that the vector calculator makes a calculation with a detection period of the sensor as the unit time.

The eighth automation apparatus is any of the third to sixth automation apparatuses characterized in that the vector calculator makes a calculation with a control period of the work controller as the unit time.

The ninth automation apparatus is any of the first to eighth automation apparatuses characterized in that the sensor has a camera that optically captures a two-dimensional image of a target environment including the work, as the detection information.

The tenth automation apparatus is the ninth automation apparatus characterized in that the camera is a high-definition camera including a wide-angle lens with low distortion.

The eleventh automation apparatus is the ninth or tenth automation apparatus characterized in that the position detector detects the current position information in its own machine coordinate system by image recognition based on the two-dimensional image.

The twelfth automation apparatus is the eleventh automation apparatus characterized in that a position and an attitude of the camera in its own machine coordinate system are known, and the position detector performs image recognition on the basis of a learning content in a machine learning process that is reflective of the position and the attitude of the camera.

The thirteenth automation apparatus is any of the first to twelfth automation apparatuses characterized in that the sensor has a distance measurement sensor that measures a spaced distance from a measurement point on an outer periphery surface of the target environment including the work, as the detection information.

The fourteenth automation apparatus is any of the ninth to thirteenth automation apparatuses characterized in that a position and an attitude of the sensor in its own machine coordinate system are known, and the position detector has a sensor position detector configured to detect current position information in a sensor coordinate system set separately in the sensor, on the basis of the detection information of the sensor, and a coordinate transformer configured to transform the current position information in the sensor coordinate system into current position information in its own machine coordinate system, on the basis of the position and the attitude of the sensor.

The fifteenth automation apparatus is any of the first to fourteenth automation apparatuses characterized in that the entire mechanism is configured to be movable, and its own machine coordinate system is set with reference to a mechanical location of the mechanism.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An automation apparatus comprising:
   a mechanism having a machine coordinate system and configured to work on a work which moves in the machine coordinate system;
   a sensor configured to successively detect positions of the work as the work moves; and
   a processor configured to
      calculate a plurality of machine coordinate positions of the work in the machine coordinate system successively based on the positions successively detected by the sensor,
      determine, based on the plurality of machine coordinate positions of the work, a working position at which the mechanism is configured to work on the work,
      calculate a moving speed vector of the work based on the plurality of machine coordinate positions of the work,
      calculate a predicted position of the work based on the moving speed vector and anyone of the plurality of machine coordinate positions,
      determine the predicted position as the working position of the work,
      calculate an arrival timing at which the work arrives at the predicted position,
      calculate a rate of change with respect to time in the moving speed vector, and
      calculate the predicted position of the work and the arrival timing based on the moving speed vector, the rate of change, and anyone of the plurality of machine coordinate positions.

2. The automation apparatus according to claim 1, wherein the processor is configured to determine a newest machine coordinate position among the plurality of machine coordinate positions of the work as the working position.

3. The automation apparatus according to claim 1, wherein the processor is configured to calculate the predicted position based on the plurality of machine coordinate positions except for at least one of the plurality of machine coordinate positions if the at least one of the plurality of machine coordinate positions is failed to be calculated.

4. The automation apparatus according to claim 1, wherein the processor is configured to calculate the predicted position with a detection period of the sensor.

5. The automation apparatus according to claim 1, wherein the processor is configured to calculate the predicted position with a control period of the processor.

6. The automation apparatus according to claim 1, wherein
   the sensor comprises a camera that is configured to optically capture a two-dimensional image of the work.

7. The automation apparatus according to claim 6, wherein
   the camera is a high-definition camera including a wide-angle lens with low distortion.

8. The automation apparatus according to claim 6, wherein
   the processor is configured to calculate the plurality of machine coordinate positions of the work via image recognition based on the two-dimensional image.

9. The automation apparatus according to claim 8, wherein
   the processor is configured to perform image recognition based on a learning content in a machine learning process that is reflective of a position and an attitude of the camera.

10. The automation apparatus according to claim 1, wherein
    the sensor includes a distance measurement sensor that is configured to measure a spaced distance from a measurement point on an outer periphery surface of a target environment including the work.

11. The automation apparatus according to claim 6, wherein
the processor is configured to
gain a plurality of sensor coordinate positions of the work in the sensor coordinate system successively based on the positions successively detected by the sensor, and
transform the plurality of sensor coordinate positions into the machine coordinate positions based on a position and an attitude of the sensor.

12. The automation apparatus according to claim 1, wherein
an entirety of the mechanism is movable, and
the machine coordinate system is set with reference to a position of the mechanism.

13. The automation apparatus according to claim 1, wherein the moving speed vector includes a moving speed of the work and a moving direction of the work.

14. A method for controlling a mechanism, comprising:
providing the mechanism which has a machine coordinate system and which is configured to work on a work which moves in the machine coordinate system;
detecting positions of the work successively as the work moves;
calculating a plurality of machine coordinate positions of the work in the machine coordinate system successively based on the positions successively detected;
determining, based on the plurality of machine coordinate positions of the work, a working position at which the mechanism is configured to work on the work;
calculating a moving speed vector of the work based on the plurality of machine coordinate positions of the work;
calculating a predicted position of the work based on the moving speed vector and anyone of the plurality of machine coordinate positions;
determining the predicted position as the working position of the work;
calculating an arrival timing at which the work arrives at the predicted position;
calculating a rate of change with respect to time in the moving speed vector; and
calculating the predicted position of the work and the arrival timing based on the moving speed vector, the rate of change, and anyone of the plurality of machine coordinate positions.

15. An automation apparatus comprising:
mechanism means for working on a work which moves in a machine coordinate system of the mechanism means;
detection means for successively detecting positions of the work as the work moves;
calculation means for calculating a plurality of machine coordinate positions of the work in the machine coordinate system successively based on the positions successively detected;
determining means for determining, based on the plurality of machine coordinate positions of the work, a working position at which the mechanism is configured to work on the work;
vector calculating means for calculating a moving speed vector of the work based on the plurality of machine coordinate positions of the work;
predicted position calculating means for calculating a predicted position of the work based on the moving speed vector and anyone of the plurality of machine coordinate positions;
predicted position determining means for determining the predicted position as the working position of the work;
arrival timing calculating means for calculating an arrival timing at which the work arrives at the predicted position;
vector change rate calculating means for calculating a rate of change with respect to time in the moving speed vector; and
the predicted position calculating means calculating the predicted position of the work and the arrival timing based on the moving speed vector, the rate of change, and anyone of the plurality of machine coordinate positions.

* * * * *